UNITED STATES PATENT OFFICE.

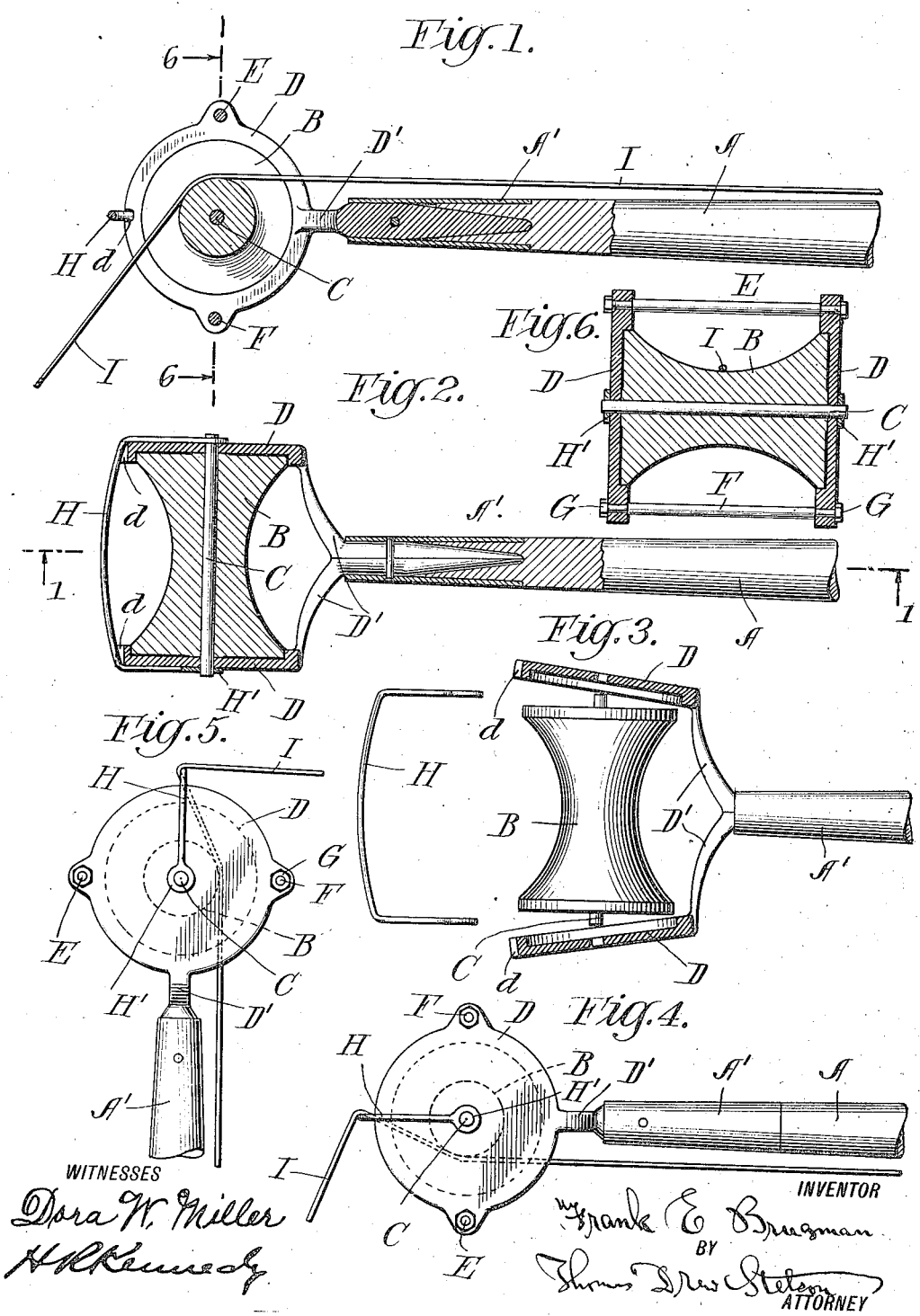

FRANK E. BRUGMAN, OF NEW YORK, N. Y.

FISHING-TIP.

1,142,796.　　　　Specification of Letters Patent.　　Patented June 15, 1915.

Application filed September 9, 1914. Serial No. 860,829.

*To all whom it may concern:*

Be it known that I, FRANK E. BRUGMAN, of New York city, in the State of New York, a citizen of the United States, have invented a new and useful Improvement in Fishing-Tips, of which the following is a full and exact specification.

It relates to the employment of a sheave to reduce the resistance to the reeling in of a strongly resistant fish and to provide the durability of the line. It guides the line as it approaches and leaves the sheave and contributes to the holding of it until the proper time in making a cast. It also provides by an elastic construction for making parts integral and light and strong, and for removing and replacing the sheave when necessary in repairs. A large part of its effect is attained by a peculiarly formed and mounted member which I term a loop.

The accompanying drawings form a part of the specification and represent what I esteem the best means of carrying out the invention.

Figures 1, 2, 3 and 4 show it in the horizontal position often held while in use. Fig. 1 is a longitudinal vertical section in the plane of the axis, the rod being held in the ordinary position. Fig. 2 is a corresponding longitudinal section in a plane quarter revolved. Fig. 3 is a section corresponding to Fig. 1 with the sheave in the act of being taken out or being put in. Fig. 4 shows the position still horizontal but having been half rotated on its own axis so that the line runs over the loop, a position which may on rare occasions be desired. Fig. 5 corresponds to Fig. 1 but with the pole and its attachments erect and with the line extended horizontally in the act of being swung around for a cast. Fig. 6 is a cross sectional view taken on the line 6—6 in Fig. 1.

Similar letters of reference indicate like parts in all the figures where they appear.

Referring to the figures, A is a portion of the fishing rod and A' the light socket piece thereon.

B is a sheave and D and D are what I will term "cheeks" lying on each side of the sheave, recessed on their inner faces and elastically connected to the socket piece.

C is a slender axis or shaft carried in the cheeks and extending loosely through the sheave. The sheave revolves loosely in the recesses. The two cheeks are connected by light distance-pieces called cross-bars E and F secured by nuts G.

H is what I term the loop. It is attached at each end by an eye H' to the corresponding extended end of the axis C. It extends radially therefrom to the periphery of the corresponding cheek; at that point it makes an angular bend inward and rests in a notch *d* in the cheek. This loop is curved where it extends across the interval between the cheeks.

The line I in running out comes along the pole A and leads over the sheave. It runs under the cross bar E and under the loop H and thence downward. When the line is being reeled in, it follows the same path but of course in the opposite direction. The curved form of the loop contributes to keep the line on the mid-length of the sheave whenever it is in contact therewith. All these parts are smooth.

When the pole is nearly upright and moved to swing the line around, as in making a cast, the loop H is useful in a sense which is momentarily the opposite of the smooth guarding and the frictionless running,—it aids to hold fast. The line contacts with the loop, bending sharply. It contributes to hold itself. But the contact is off, the friction is removed, when a fraction of a second later the line swings through the other part of the circuit, over the water. Then the ordinary intentional movement by the operator releasing the reel, aided by the automatic release of the line at the tip, gives the prompt liberation desired.

When at any time the user desires to lay down the fishing rod for a short or a long period, or chooses for any reason to carry the line with more than usual resistance to its running out, he can turn the pole one or more times on its own axis bringing the line in strong contact with the loop and perhaps winding around some other parts, making abundant friction. Turning it back to its original position restores it again to its usual easy condition. Fig. 4 shows one stage of such proceeding, the pole held horizontally is half revolved and the line temporarily locked.

The material of the metal parts may be nickel-steel, whatever its nature the form is important. The arms D', D' which connect the cheeks D and D with the socket piece A', I drop-forge deep and thin, approximating the form of corset springs, this gives great strength in the direction to perform its function when strained by resistance in pulling the fish or in clearing the line when foul with something in the water, but yielding without injury to a strong pull in the lateral direction, moving the cheeks apart of course. It is easy without elaborate tools to put in or take out the sheave.

Modifications may be made without departing from the principle or sacrificing the advantages of the invention. The axis may be loose in the sheave and allowed to have a tight union with the cheeks and the loop instead of the manner shown.

I claim as my invention:

1. In a fishing rod tip, a sheave, cheeks lying on each side of said sheave and resilient arms carrying said cheeks and having portions to engage in the socket piece of the rod, and a loop sleeved on the ends of the axis of the sheave with its ends bearing against said cheeks, said loop being curved.

2. In a fishing rod tip, a sheave, cheeks in which the axis of said sheave is mounted, said cheeks having notches, and a loop mounted on said axis and having bends seated in said notches.

3. In a fishing rod tip, a sheave, cheeks in which the axis of said sheave is mounted, and a loop mounted on said axis and having bends seated in said notches, said loop being curved at its center.

4. In a fishing rod tip, resilient arms, cheeks carried by said arms, a sheave having its axis extended loosely therethrough and mounted in said cheeks, and a loop having eyes receiving the ends of said axis, said loop being curved between said cheeks.

Signed at borough of the Bronx, N. Y. city, this 4th day of September 1914.

FRANK E. BRUGMAN.

Witnesses:
EDWARD E. McILDUFF,
J. HY. BROWNE.